US009466984B2

(12) United States Patent
Cardinal et al.

(10) Patent No.: US 9,466,984 B2
(45) Date of Patent: Oct. 11, 2016

(54) POWER RAMP RATE CONTROL FOR RENEWABLE VARIABLE POWER GENERATION SYSTEMS

(75) Inventors: Mark Edward Cardinal, Schenectady, NY (US); Jignesh Govindlal Gandhi, Simpsonville, SC (US); Andreas Kirchner, Salzbergen (DE)

(73) Assignee: General Electric Company, Schenectady, NY (US)

( * ) Notice: Subject to any disclaimer, the term of this patent is extended or adjusted under 35 U.S.C. 154(b) by 529 days.

(21) Appl. No.: 12/606,028

(22) Filed: Oct. 26, 2009

(65) Prior Publication Data

US 2010/0145533 A1    Jun. 10, 2010

(51) Int. Cl.
*H01L 31/042* (2014.01)
*H02J 3/38* (2006.01)

(52) U.S. Cl.
CPC ............... *H02J 3/383* (2013.01); *H02J 3/386* (2013.01); *Y02E 10/563* (2013.01); *Y02E 10/763* (2013.01)

(58) Field of Classification Search
CPC .................................................. H01L 31/042
USPC ................ 700/291, 297, 298, 286; 136/244; 257/E31.001
See application file for complete search history.

(56) References Cited

U.S. PATENT DOCUMENTS

| | | | |
|---|---|---|---|
| 5,041,959 A | 8/1991 | Walker | |
| 6,909,622 B2 | 6/2005 | Weng | |
| 6,924,565 B2 | 8/2005 | Wilkins et al. | |
| 7,095,597 B1 | 8/2006 | Cousineau | |
| 7,119,452 B2 | 10/2006 | Larsen | |
| 7,166,928 B2 | 1/2007 | Larsen | |
| 7,224,081 B2 | 5/2007 | Larsen | |
| 7,531,911 B2 | 5/2009 | Rivas et al. | |
| 7,923,862 B2 | 4/2011 | Cardinal | |
| 2006/0132993 A1 | 6/2006 | Delmerico et al. | |
| 2007/0228838 A1 | 10/2007 | Delmerico et al. | |
| 2010/0057267 A1* | 3/2010 | Liu et al. | 700/297 |

OTHER PUBLICATIONS

Kakimoto et al., "Power Modulation of Photovotaic Generator for Frequency Control of Power System" IEEE Transactions on Energy Conversion, vol. 24, No. 4, Dec. 2009, pp. 943-949.*
Disclosure under 37 CFR 1.56 dated Oct. 26, 2009.
Non-Final Office Action for U.S. Appl. No. 12/574,003 mailed Aug. 24, 2010.
Amendment and Response to Non-Final Office Action for U.S. Appl. No. 12/574,003, filed Nov. 23, 2010.
Notice of Allowance for U.S. Appl. No. 12/574,003 mailed Jan. 5, 2011.
Submission of Supplemental Information Disclosure Statement under 37 C.F.R. § 1.56 filed May 27, 2011.

* cited by examiner

*Primary Examiner* — Tejal Gami
(74) *Attorney, Agent, or Firm* — Sutherland Asbill & Brennan LLP

(57) ABSTRACT

Certain embodiments of the invention may include systems and methods for controlling power ramp rates in renewable variable power generation systems. According to an exemplary embodiment of the invention, a method is provided for limiting power ramp rates. The method can include regulating collective power output of a plurality of variable energy sources by monitoring collective power output of the plurality of variable energy sources, and controlling collective power output of the plurality of variable energy sources with the plurality of power control signals.

17 Claims, 4 Drawing Sheets

POWER RAMP RATE CONTROL FOR RENEWABLE VARIABLE POWER GENERATION SYSTEMS

FIELD OF THE INVENTION

This invention generally relates to renewable power generation, and more particularly, to systems and methods for controlling power ramp rates in renewable variable power generation systems.

BACKGROUND OF THE INVENTION

Solar and wind farms that supply power to a utility grid are generally categorized as renewable variable power generation systems. Such systems produce variable power because the harvesting of the solar or wind energy varies with cloud coverage, wind speed, etc. Each solar or wind farm may have a plurality of energy harvesting devices that may require power monitoring and control for coordinating and providing power to the electrical grid. A solar farm, for example, may include multiple photovoltaic cells and associated inverters. A wind farm may include multiple wind turbine generators and associated controllers and converters. Utilities often utilize fossil (coal and gas fired) power plants to stabilize and balance electrical power supplied to the grid, particularly during periods of intermittent sunshine (for solar farms) or during changing wind conditions (for wind farms). Fossil power plants, however, can take a relatively long time to ramp up to full operating power production. Some coal-fired power stations may take hours to ramp up from 0-to-100% of full rated power, and may take even longer to ramp down. However, the power output from the variable renewable energy sources may ramp up or down in a matter of seconds, depending on the available sunshine and wind conditions. Abrupt changes in power output from a source can reduce the frequency regulating ability of a utility grid, and fossil power generation units may have difficulties reducing their power abruptly when a variable plant increases power abruptly. Therefore a need exists to control power ramp rates of renewable variable power generation systems to be more compatible with other types of power generation units that may be limited in their power ramp response rate.

A further need exists for improved systems and methods for controlling power ramp rates in renewable variable power generation systems.

BRIEF SUMMARY OF THE INVENTION

Some or all of the above needs may be addressed by certain embodiments of the invention. Certain embodiments of the invention may include systems and methods for power ramp rate control in renewable variable power generation systems.

According to an exemplary embodiment of the invention, a method is provided for regulating collective power output of a plurality of variable energy sources. The method includes monitoring collective power output of the plurality of variable energy sources, predicting collective available power levels of the plurality of variable energy sources based at least in part on ramp rate limits, modifying the predicted collective available power levels based at least in part on limiting a rate of change of the predicted collective available power levels, determining a power regulation setpoint, generating a net power command signal based at least in part on the power regulation setpoint or the modified predicted collective available power levels, generating a plurality of power control signals based at least in part on the net power command signal, and controlling collective power output of the plurality of variable energy sources with the plurality of power control signals.

According to another exemplary embodiment of the invention, a variable energy power regulator system is provided. The system may include a controller operable to monitor the collective power output of a plurality of variable energy sources, predict the collective available power levels of the plurality of variable energy sources based at least in part on ramp rate limits, modify the predicted collective available power levels based at least in part on limiting the rate of change of the predicted collective available power levels, determine a power regulation setpoint, generate a net power command signal based at least in part on the power regulation setpoint or on the modified predicted collective available power levels, generate a plurality of power control signals based at least in part on the net power command signal, and control the collective power output of the plurality of variable energy sources with the plurality of power control signals.

According to another exemplary embodiment, a variable energy farm is provided. The variable energy farm may include a plurality of variable energy sources operable to collectively supply electrical power to a utility system, and a variable energy power regulator system operable to monitor the collective power output of the plurality of variable energy sources, predict the collective available power levels of the plurality of variable energy sources based at least in part on ramp rate limits, modify the predicted collective available power levels based at least in part on limiting the rate of change of the predicted collective available power levels, determine a power regulation setpoint, generate a net farm power command signal based at least in part on the power regulation setpoint or the modified predicted collective available power levels, generate a plurality of power control signals based at least in part on the net farm power command signal, and control the collective power output of the plurality of variable energy sources with the plurality of power control signals.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying chart and drawings, which are not necessarily drawn to scale, and wherein.

DETAILED DESCRIPTION OF THE INVENTION

Figure 1:
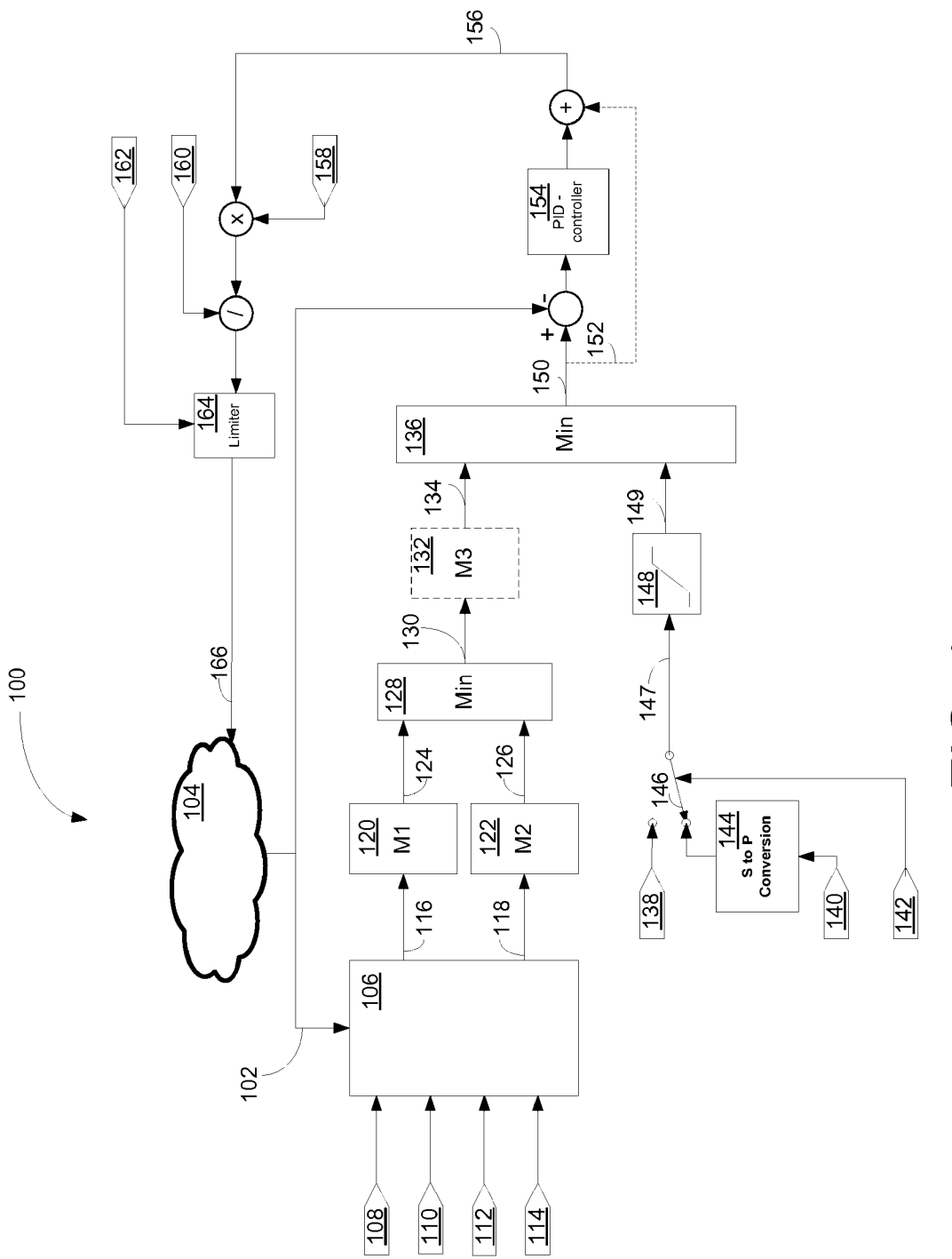
FIG. 1 is a block diagram of an illustrative active or apparent power regulator, according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable control of power ramp rates of individual and collective renewable variable power generation systems. According to certain exemplary embodiments, the invention may be utilized to limit the average ramp rate of a variable power generation system. According to other exemplary embodiments, the invention may intelligently shape a ramp rate limiter response dependent upon the measured ramp rate of the plant. According to certain exemplary embodiments of the invention, the variable energy power regulator system may be operable to allow a fast power change (still limited by an average rate) when the variable power generation plant has suddenly dipped, but to allow quick recovery to a previous value. According to other exemplary embodiments of the invention, the variable energy power regulator system may also be operable to allow a relatively slow, smooth rate of power change when the power output of the farm has been at a steady power level for a considerable amount of time.

According to certain embodiments of the invention, the ramp rate of the variable power plant may be controlled as a function of the period over which changes in the power output occur. For example, an average power ramp rate may govern over a time window of about 1 minute, but another average power ramp rate may govern over longer periods, such as 10-15 minutes. These ramp rates may be applicable for various ranges of operation including start-up, normal operation and shutdown. According to exemplary embodiments, control of the power output of the individual and collective variable power sources may be based on multiple time periods, with separate settable ramp rate limits for each time period.

In an exemplary embodiment, control of the power ramp rate may be achieved by a power setpoint communicated by the variable energy power regulator system to individual wind turbine generators, solar panel inverters, or other individual renewable variable energy sources.

According to exemplary embodiments of the invention, an average ramp rate may be defined as the rate of change in power over a fixed time period, or the average of the calculated instantaneous rates. Mathematically the average ramp rate may be defined as follows:

$$\text{RampRate\_avg} = \frac{\sum_{i=n-N+1}^{n} X_i - X_{i-1}}{T_s} \times \frac{1}{N} \quad (1)$$

where
$X_n$=the present sample power
$X_{n-1}$=the previously sampled power
t=averaging time period
$T_s$=sampling interval of the algorithm $N=t/T_s$ which is the number of samples required to average over a fixed time period Since $(X_n-X_{n-1})+(X_{n-1}-X_{n-2})=X_n-X_{n-2}$ the calculated average ramp rate can be simplified to become $$\text{RampRate\_avg} = \frac{\sum_{i=n-N+1}^{n} X_i - X_{i-1}}{T_s} \times \frac{1}{N} = (X_n - X_{n-N+1}) \quad (2)$$

According to exemplary embodiments of the invention, a predicted power limit of the plant may be calculated and compared with the measured aggregate power output value. When the measured limit approaches the predicted limit, the output of the algorithm may quickly reduce a power setpoint command to all the units in the plant.

According to exemplary embodiments of the invention, one or more modifying functions may be utilized to discriminate between a sudden change in power resulting from a loss in power and a rapid increase in power from an otherwise steady state condition. According to exemplary embodiments of the invention, the modifying function may continue to allow the plant to recover quickly from a recoverable and quick drop in power, but slowly and more gradually allow the plant to increase power during conditions where the net power is monotonically or near monotonically increasing. Accordingly, certain embodiments of the invention may allow precise adjustment of the power output to maximize the energy capture of the plant during sustained and rapid increases in wind or sunlight while still being able to maintain an average power level during transient conditions.

Various systems and methods for controlling the power ramp rate of certain variable energy sources, according to embodiments of the invention, will now be described with reference to the accompanying figures.

FIG. 1 illustrates a variable energy power regulator system 100 with ramp controlled supplementary input. According to exemplary embodiments of the invention, the system 100 may regulate the power output of one or more variable energy sources 104, based at least in part on the aggregate measured power 102 produced by the variable energy sources 104, and further on a plurality of setpoints and other control inputs that may be received from a central controller or from other communication channels.

According to an exemplary embodiment of the invention, power control signals 166 for each of N devices may be determined by the system 100 to control each of a plurality of renewable variable energy sources 104. The aggregate power produced by the plurality of renewable variable energy sources 104 may be measured, and the aggregate measured power 102 may be utilized in a feedback system for controlling the ramp rate of the aggregate output power.

According to exemplary embodiments of the invention, a ramp rate prediction algorithm 106 may be utilized to predict the power output that the variable energy sources (farm) 104 can produce without exceeding specified ramp rates. For example, a first ramp rate limit 108 over a first ramp rate time duration 110 may be used as input to the ramp rate prediction algorithm 106. The ramp rate prediction algorithm 106 may compare the average aggregate measured power 102 output of the farm 104 over the first ramp rate time duration 110, and may produce an output PPmax1 116 value representative of the additional power that could be produced by the farm 104 without exceeding the farm 104 rated power, and without exceeding the first ramp rate limit 108 over the first ramp rate time duration 110. Similarly, the ramp rate prediction algorithm 106 may produce additional outputs. For example, output PPmax2 118 may be produced and may be representative of the additional power that could be produced by the farm 104 without exceeding the farm rated power and without exceeding a second ramp rate limit 112 over a second ramp rate time duration 114.

According to exemplary embodiments of the invention, the outputs 116, 118 from the ramp rate prediction algorithm 106 may be further processed by respective modifying functions M1 120 and M2 122 to further control the signals PPmax1 116 and PPmax2 118, resulting in respective adjusted predicted maximum power values APPmax1 124 and APPmax2 126. Details of the modifying functions M1 120 and M2 122 will be discussed below with reference to FIGS. 2 and 3.

With continued reference to FIG. 1, and according to certain exemplary embodiments, APPmax1 124 and APPmax2 126 may be compared via a first minimum selector function 128, and the minimum of the inputs (APPmax1 124 and APPmax2 126) may be passed to the output 130 of the first minimum selector function 128. The output 130 of the first minimum selector function 128 (i.e., the minimum of the adjusted predicted max power values APPmax1 124 and APPmax2 126) may optionally be processed by another modifying function M3 132 (which will also be discussed below with reference to FIGS. 2 and 3), resulting in a signal PWR A 134 representing a modified predicted collective power level available that may be utilized as input for a second minimum selector function 136.

According to an exemplary embodiment, and with continued reference to FIG. 1, a second input, PWR B 149, representing a power regulation setpoint may be input to the second minimum selector function 136. The PWR B 149 regulation signal may be based either upon an active power (watts) setpoint 138, or upon an apparent power (volt-amps) setpoint 140, depending on the state of the mode select 142 that may control the switch 146. If the apparent power setpoint 140 is selected as the mode of regulation, an apparent (S) to active (P) power converter 144 may be utilized to convert the active power setpoint 138 to watts. According to certain exemplary embodiments, a gradient limiter 148 may accept the chosen power setpoint 147 (active power setpoint 138 or converted apparent power setpoint 140) and may limit the setpoint signal to the maximum rated power of the farm 104. The gradient limiter 148 may also be utilized to limit the slew rate of the chosen power setpoint 147 signal, and may further condition the chosen power setpoint 147 signal to produce the power regulation setpoint PWR B 149 for input into the second minimum selector function 136.

According to exemplary embodiments of the invention, the second minimum selector function 136 is operable to select the minimum value among inputs. For example, one input PWR A 134 may be based upon ramp rate limits, as previously described. Another input, PWR B 149, may be based upon power setpoints, as previously described. The minimum of these inputs may be selected as a power reference 150 that can be utilized for regulating the power of the farm 104. The farm aggregate measured power 102 signal may be subtracted from the power reference 150 to produce an error signal for input to a PID controller 154. The PID controller 154 may produce a NET farm power command 156 that may be limited to the farm rated power. According to an optional exemplary embodiment, a feed-forward 152 path may be utilized to bypass the PID controller 154. Such a feed-forward path 152 may provide a higher bandwidth performance of the power regulation.

According to an exemplary embodiment of the invention, the NET farm power command 156 may be further processed to provide individual power control signals 166 for each variable energy source in the farm 104. For example, the NET farm power command 156 may be multiplied by the rated power for device N 158 and divided by the farm online rated power 160 to produce the individual power control signals 166. Optionally, the resulting value may be limited by the optional limiter 164 if further refinements are warranted. For example, a solar source may have an associated inverter with a maximum inverter N power rating 162 that may be less than the rated power for device N 158. According to exemplary embodiments of the invention, the resulting plurality of power control signals for device N 158 may be utilized to control the plurality of the variable energy sources (farm) 104, thereby completing a feedback control loop based on the aggregate measured power 102 and the automatic selection of either ramp rate or power setpoint control.

Modifying Functions

Figure 2:
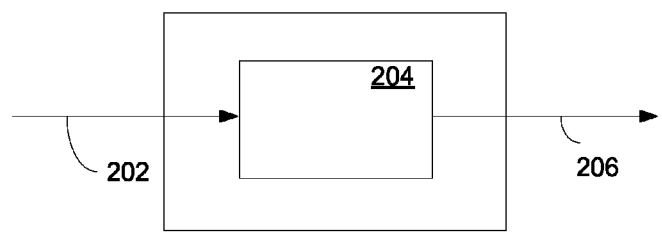
FIG. 2 is a block diagram of an illustrative modifying function, according to an exemplary embodiment of the invention.
Figure 3:
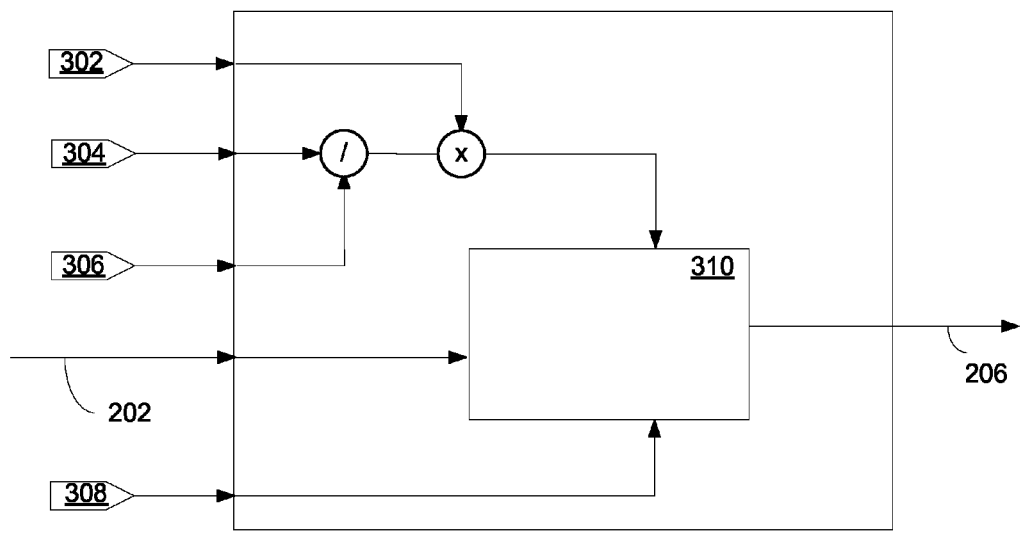
FIG. 3 is a block diagram of another illustrative modifying function, according to an exemplary embodiment of the invention.

FIGS. 2 and 3 depict exemplary modifying functions (M1 120, M2 122, M3 132) that may be utilized to condition one or more of the ramp rate limited signals (116, 118, 130) as depicted in FIG. 1, according to exemplary embodiments of the invention. FIG. 2 indicates that the modifying functions (M1 120, M2 122, M3 132) may include a low pass filter 204. According to exemplary embodiments, the low pass filter 204 may be adjustable for setting cutoff frequency, shelving, and attenuation slope. Therefore, the generalized output 206 of the modifying function may be a bandwidth-limited version of the generalized input 202. In this regard, the modifying function of FIG. 2 may be utilized for eliminating rapid fluctuations in the generalized input 202 signal.

FIG. 3 indicates another exemplary embodiment of the modifying functions (M1 120, M2 122, M3 132). In this embodiment, the input 202 signal may be limited by a slew rate limiter 310, and may produce an output 206 that may be limited by a first or a second slew rate, depending upon the direction of change in the signal. For example, a reduction in the general input 202 signal may be governed by the slew rate limiter 310 at a first rate set by the slew rate down limit 308. Conversely, an increase in the general input 202 signal may be governed by a second slew rate that may in turn be based on additional input signals, including an average ramp rate 306, a ramp rate limit 304, and an instantaneous ramp rate up gain 302. According to exemplary embodiments, the modifying function, as depicted in FIG. 3, may allow rapid changes when reducing power, but may limit the rate of change to a slower value when increasing power.

Figure 4:
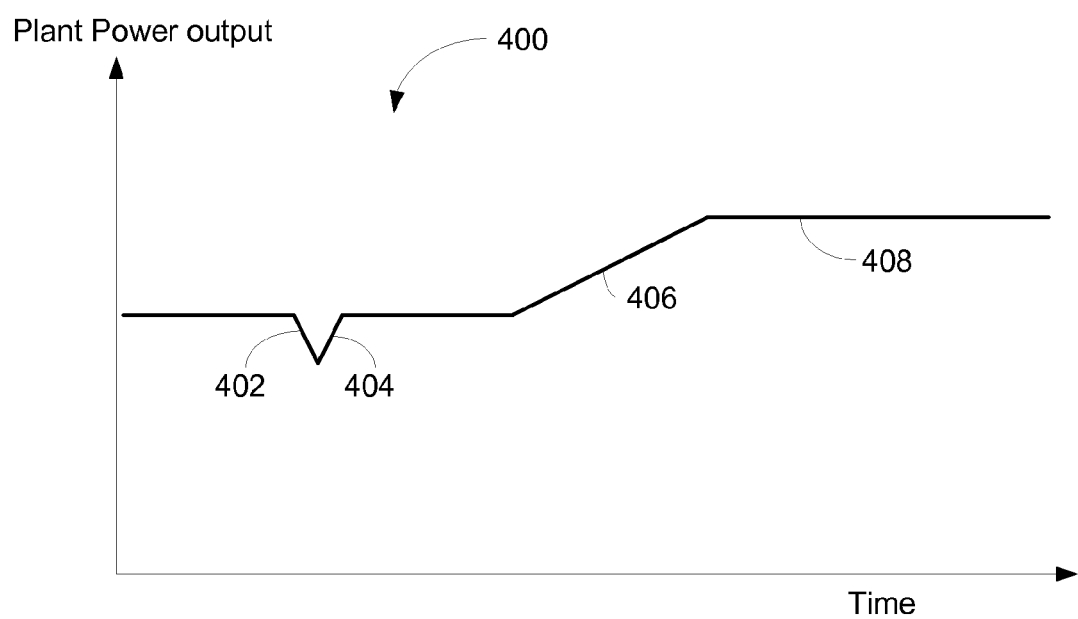
FIG. 4 is a chart of plant power output with respect to time according to an exemplary embodiment of the invention.

According to exemplary embodiments of the invention, and as depicted in FIG. 4, a variable energy power regulator system such as 100 in FIG. 1 may regulate farm or plant power output differently, depending upon the direction of regulation, and upon different ramp rate time duration windows. For example, the chart 400 in FIG. 4 depicts an exemplary plant power output graph as a function of time. In an exemplary embodiment, various environmental or other conditions may cause the plant power output to decrease rapidly 402, for example, from a sudden loss of power from a renewable energy source. The decrease in power output over a relatively short period of time may be quickly corrected 404 if the power then becomes available (i.e., wind speed may pick back up, or cloud coverage may dissipate). On the other hand, the variable energy power regulator system 100 may limit the plant power output to a slower slew rate 406 when the available power is increasing. In this regard, the variable energy power regulator system 100 may allow different regulation slew rates in the power plant output, depending upon the direction of the power plant change, and upon previous changes that may have occurred prior to the reduction 402 or increase 406 in available power. The variable energy power regulator system 100 may regulate the output power to a steady state 408 when the variable energy sources 104 are steadily producing power.

Figure 5:
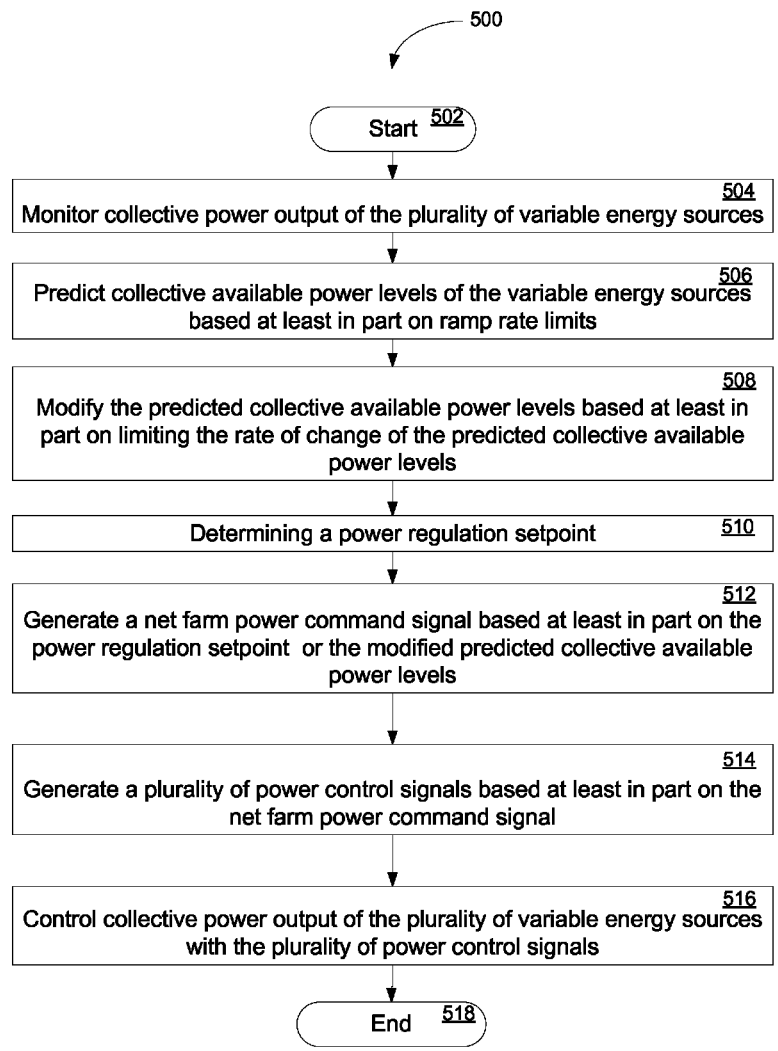
FIG. 5 is a method flow diagram according to an exemplary embodiment of the invention.

An exemplary method 500 for controlling the collective output of a plurality of variable energy sources will now be described with reference to the flow diagram of FIG. 5. The method 500 starts in block 502. In block 504 and according to an exemplary embodiment of the invention, the collective or aggregate measured power 102 output of a plurality of variable energy sources such as 104 may be monitored. In block 506, collective available power levels of the variable energy sources 104 may be predicted based at least in part on ramp rate limits 108, 112. In block 508, the predicted collective available power levels may be modified based at least in part on limiting the rate of change of the predicted collective available power levels. In block 510, a power regulation setpoint may be determined. In block 512, a NET farm power command 156 signal may be generated based at least in part on the power regulation setpoint or on the modified predicted collective available power levels. The method 500 continues in block 514 where a plurality of power control signals may be generated based at least in part on the NET farm power command 156 signal. In block 516, the collective power output of the plurality of variable energy sources 104 may be controlled with the plurality of power control signals 166. The method 500 ends with block 518.

Accordingly, certain exemplary embodiments of the invention can provide the technical effects of creating certain systems and methods that control individual and collective power output of a plurality of variable energy sources. Certain exemplary embodiments of the invention can provide the further technical effects of providing systems and methods for controlling the power ramp rates of the variable energy sources 104.

In certain embodiments of the invention, a variable energy power regulator system such as 100 may include any number of software applications that are executed to facilitate any of the operations.

In certain embodiments, one or more input/output (I/O) interfaces may facilitate communication between the variable energy power regulator system 100, external controllers, and one or more I/O devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the variable energy power regulator system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the variable energy power regulator system 100 inputs and outputs to one or more suitable networks and/or connections; for example, the connections that facilitate communications with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the variable energy power regulator system 100 with more or less of the components illustrated in FIGS. 1, 2, and 3.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope The claimed invention is:

1. A method for regulating collective power output of a plurality of variable energy sources, the method comprising:
   monitoring collective power output of the plurality of variable energy sources;
   predicting future collective available power levels of the plurality of variable energy sources based at least in part on a first desired collective power ramp rate over a first time duration and a second desired collective power ramp rate over a second time duration, wherein the predicting of the future collective available power levels comprises:
      establishing an average ramp rate for each time duration calculated as $(X_n - X_{n-N+1})$, wherein $X_n$ is a power output at $n_{th}$ time period and N is the total number of time periods in the time duration;
      determining the future collective available power levels based on the average ramp rate; and
      comparing the future collective available power levels to a settable ramp rate limit;
   based on the comparison, modifying, using at least one modifying function, the predicted collective available power levels based at least in part on limiting the rate of change of the predicted collective available power levels depending upon a direction of power change, wherein the at least one modifying function provides for faster slew rates when reducing power, to rapidly correct a transient condition, and slower slew rates when increasing power, wherein the at least one modifying function includes a low pass filter and a slew rate limiter;
   determining a power regulation setpoint based on the modified predicted collective available power levels;
   selecting a minimum of the collective available power levels and the power regulation setpoint;
   based at least in part on the selection, generating a net power command signal based at least in part on the modified predicted collective available power levels;
   generating a plurality of power control signals based at least in part on the net power command signal; and
   controlling collective power output of the plurality of variable energy sources with the plurality of power control signals to allow different collective rates of change of power output depending upon the direction of power change or upon previous power changes, wherein the collective rate of change of power output of the variable energy sources does not exceed a first desired collective power ramp rate over the first time duration.

2. The method of claim 1, wherein the predicted collective available power levels are operable to control collective power output of the variable energy sources wherein the collective rate of change of power output of the variable energy sources does not exceed the first desired collective power ramp rate over the first the duration and does not exceed the second desired collective power ramp rate over the second time duration.

3. The method of claim 2, wherein modifying the predicted collective available power levels is based at least in part on a desired collective power ramp rate.

4. The method of claim 1, wherein controlling collective power output of the plurality of variable energy sources further comprises communicating a power reference signal to the plurality of variable energy sources wherein the power reference signal is determined as a minimum of the modified predicted collective available power levels and the power regulator setpoint.

5. The method of claim 1, wherein controlling collective power output of the plurality of variable energy sources is further based on power ratings of the plurality of variable energy sources.

6. The method of claim 1, wherein determining a power regulation setpoint comprises providing an active power setpoint or an apparent power setpoint.

7. A variable energy power regulator system, comprising a controller operable to:
   monitor collective power output of a plurality of variable energy sources;
   predict future collective available power levels of the plurality of variable energy sources based at least in part on a first desired collective power ramp rate over a first time duration and a second desired collective power ramp rate over a second time duration, wherein the predicting of the future collective available power levels comprises:
      establishing an average ramp rate for each time duration calculated as $(X_n - X_{n-N+1})$, wherein $X_n$ is a power output at $n_{th}$ time period and N is the total number of time periods in the time duration;
      determining the future collective available power levels based on the average ramp rate; and
      comparing the future collective available power levels to a settable ramp rate limit;
   based on the comparison, modify, using at least one modifying function, the predicted collective available power levels based at least in part on limiting the rate of change of the predicted collective available power levels depending upon a direction of power change to produce a modified predicted collective available power levels, wherein the at least one modifying function provides for faster slew rates when reducing power, to rapidly correct a transient condition, and slower slew rates when increasing power, wherein the at least one modifying function includes a low pass filter and a slew rate limiter;
   determine a power regulation setpoint based on the modified predicted collective available power levels;
   select a minimum of the collective available power levels and the power regulation setpoint;
   based at least in part on the selection, generate a net power command signal based at least in part on the modified predicted collective available power levels;
   generate a plurality of power control signals based at least in part on the net power command signal; and
   control collective power output of the plurality of variable energy sources with the plurality of power control signals to allow different collective rates of change of power output depending upon the direction of power change or upon previous power changes, wherein the collective rate of change of power output of the variable energy sources does not exceed a first desired collective power ramp rate over the first time duration.

8. The system of claim 7, wherein the predicted collective available power levels are operable to control collective power output of the variable energy sources wherein the collective rate of change of power output of the variable energy sources does not exceed the first desired collective power ramp rate over the first time duration and does not exceed the second desired collective power ramp rate over the second time duration.

9. The system of claim 7, wherein the controller is further operable to modify the predicted collective available power levels based at least in part on a desired collective power ramp rate.

10. The system of claim 7, wherein the controller is further operable to control collective power output of the plurality of variable energy sources by communicating a power reference signal to the plurality of variable energy sources, wherein the power reference signal is determined as the minimum of the modified predicted collective available power levels and the power regulator setpoint.

11. The system of claim 7, wherein the controller is further operable to control collective power output of the plurality of variable energy sources based on power ratings of the plurality of variable energy sources.

12. The system of claim 7, wherein the controller is further operable to generate a power regulation setpoint comprising an active power setpoint or an apparent power setpoint.

13. A solar farm, comprising:
a plurality of variable energy sources and inverters operable to collectively supply electrical power to a utility system; and
a variable energy power regulator system operable to:
monitor collective power output of the plurality of variable energy sources and inverters;
predict future collective available power levels of the plurality of variable energy sources and inverters based at least in part on a first collective power ramp rate limit over a first ramp rate time duration and a second predicted available power based on a second collective power ramp rate limit over a second time duration, wherein the predicting of the future collective available power levels comprises:
establishing an average ramp rate for each time duration calculated as $(X_n - X_{n-N+1})$, wherein $X_n$ is a power output at $n_{th}$ time period and N is the total number of time periods in the time duration;
determining the future collective available power levels based on the average ramp rate; and
comparing the future collective available power levels to a settable ramp rate limit;
based on the comparison, modify, using at least one modifying function, the predicted collective available power levels based at least in part on limiting the rate of change of the predicted collective available power levels depending upon a direction of power change, wherein the at least one modifying function provides for faster slew rates when reducing power, to rapidly correct a transient condition, and slower slew rates when increasing power, wherein the at least one modifying function includes a low pass filter and a slew rate limiter;
determine a power regulation setpoint based on the modified predicted collective available power levels;
select a minimum of the collective available power levels and the power regulation setpoint;
based at least in part on the selection, generate a net farm power command signal based at least in part on the modified predicted collective available power levels;
generate a plurality of power control signals based at least in part on the net farm power command signal; and
control collective power output of the plurality of variable energy sources and inverters with the plurality of power control signals to allow different collective rates of change of power output depending upon the direction of power change or upon previous power changes, wherein the collective rate of change of power output of the variable energy sources does not exceed a first desired collective power ramp rate over the first time duration.

14. The solar farm of claim 13, wherein the processor is further operable to control collective power output of the plurality of variable energy sources by communicating a power reference signal to the plurality of variable energy sources and inverters via a closed loop PID feedback control system, wherein the power reference signal is determined as the minimum of the modified predicted collective available power levels and the power regulator setpoint.

15. The solar farm of claim 13, wherein the processor is further operable to modify the predicted collective available power levels based at least in part on desired collective power ramp rates.

16. The solar farm of claim 13, wherein the processor is further operable to control collective power output of the plurality of variable energy sources and inverters based on power ratings of the plurality of variable energy sources and inverters.

17. The solar farm of claim 13, wherein the processor is further operable to generate a power regulation setpoint comprising an active power setpoint or an apparent power setpoint.

* * * * *